(12) United States Patent
Wolfe et al.

(10) Patent No.: US 6,789,060 B1
(45) Date of Patent: Sep. 7, 2004

(54) NETWORK BASED SPEECH TRANSCRIPTION THAT MAINTAINS DYNAMIC TEMPLATES

(76) Inventors: Gene J. Wolfe, 490 East St., Pittsford, NY (US) 14534; Seth A. Borg, 300 Council Rock Ave., Rochester, NY (US) 14610

( * ) Notice: Subject to any disclaimer, the term of this patent is extended or adjusted under 35 U.S.C. 154(b) by 441 days.

(21) Appl. No.: 09/699,477

(22) Filed: Oct. 31, 2000

(51) Int. Cl.$^7$ .......................... G10L 15/26; G10L 21/06; G06F 9/46

(52) U.S. Cl. .................... 704/235; 704/275; 704/270.1; 718/102; 718/103; 718/104

(58) Field of Search ............................... 704/235, 220, 704/220.1, 275, 1, 9; 705/34, 3, 41; 700/96

(56) References Cited

U.S. PATENT DOCUMENTS

| | | | |
|---|---|---|---|
| 3,965,484 A | | 6/1976 | Matz et al. |
| 4,315,309 A | * | 2/1982 | Coli .............................. 705/3 |
| 5,050,088 A | * | 9/1991 | Buckler et al. ............... 700/96 |
| 5,146,439 A | | 9/1992 | Jachmann et al. |
| 5,267,155 A | * | 11/1993 | Buchanan et al. .......... 715/540 |
| 5,369,704 A | | 11/1994 | Bennett et al. |
| 5,649,182 A | | 7/1997 | Reitz |
| 5,696,906 A | * | 12/1997 | Peters et al. ................... 705/34 |
| 5,699,411 A | * | 12/1997 | Becker et al. ........... 379/88.22 |
| 5,704,371 A | * | 1/1998 | Shepard ...................... 128/897 |
| 5,721,913 A | * | 2/1998 | Ackroff et al. ................ 704/1 |
| 5,724,405 A | | 3/1998 | Engelke et al. |
| 5,740,245 A | | 4/1998 | Bennett et al. |
| 5,745,901 A | * | 4/1998 | Entner et al. ................... 704/1 |
| 5,752,227 A | * | 5/1998 | Lyberg ....................... 704/235 |
| 5,774,841 A | | 6/1998 | Salazar et al. |
| 5,812,882 A | | 9/1998 | Raji et al. |
| 5,815,639 A | | 9/1998 | Bennett et al. |
| 5,823,948 A | | 10/1998 | Ross, Jr. et al. |
| 5,845,150 A | | 12/1998 | Henion |
| 5,875,436 A | | 2/1999 | Kikinis |
| 5,875,448 A | * | 2/1999 | Boys et al. .................. 704/235 |
| 5,884,256 A | | 3/1999 | Bennett et al. |
| 5,920,835 A | * | 7/1999 | Huzenlaub et al. ......... 704/235 |
| 5,926,787 A | | 7/1999 | Bennett et al. |
| 5,933,805 A | | 8/1999 | Boss et al. |
| 5,950,194 A | | 9/1999 | Bennett et al. |
| 5,960,399 A | * | 9/1999 | Barclay et al. ............. 704/275 |
| 5,963,903 A | | 10/1999 | Hon et al. |
| 5,978,755 A | | 11/1999 | Podhradsky |
| 5,995,948 A | * | 11/1999 | Whitford et al. ............. 705/41 |
| 6,047,257 A | * | 4/2000 | Dewaele ..................... 704/270 |
| 6,055,498 A | | 4/2000 | Neumeyer et al. |
| 6,092,045 A | | 7/2000 | Stubley et al. |
| 6,122,613 A | | 9/2000 | Baker |
| 6,122,614 A | | 9/2000 | Kahn et al. |
| 6,138,088 A | * | 10/2000 | Goeser ........................ 704/9 |
| 6,173,259 B1 | | 1/2001 | Bijl et al. |
| 6,175,822 B1 | | 1/2001 | Jones |
| 6,182,043 B1 | | 1/2001 | Böldl |
| 6,249,765 B1 | | 6/2001 | Adler et al. |
| 6,259,657 B1 | | 7/2001 | Swinney |
| 6,282,154 B1 | | 8/2001 | Webb |
| 6,282,510 B1 | | 8/2001 | Bennett et al. |

(List continued on next page.)

Primary Examiner—Richemond Dorvil
Assistant Examiner—Daniel A. Nolan
(74) Attorney, Agent, or Firm—Miles & Stockbridge P.C.; Jason H. Vick

(57) ABSTRACT

The systems and methods described herein allow dictation and associated routing and formatting information to be forwarded to a transcription system. The transcription system converts the information into a document. The additional information associated with the dictation is then applied to the document to ensure proper formatting, routing, or the like. The completed document is returned to the original dictator for review and proofing. Upon approval, the document is distributed via the transcription system in accordance with distribution information associated with the document.

27 Claims, 14 Drawing Sheets

U.S. PATENT DOCUMENTS

| | | | |
|---|---|---|---|
| 6,298,326 B1 * | 10/2001 | Feller | 704/270 |
| 6,304,844 B1 | 10/2001 | Pan et al. | |
| 6,308,158 B1 * | 10/2001 | Kuhnen et al. | 704/235 |
| 6,336,108 B1 | 1/2002 | Thiesson et al. | |
| 6,342,903 B1 | 1/2002 | Fado et al. | |
| 6,358,519 B1 | 3/2002 | Waterman | |
| 6,392,633 B1 | 5/2002 | Leiper | |
| 6,400,806 B1 | 6/2002 | Uppaluru | |

* cited by examiner

NETWORK BASED SPEECH TRANSCRIPTION THAT MAINTAINS DYNAMIC TEMPLATES

BACKGROUND OF THE INVENTION

1. Field of the Invention

This invention relates to a transcription system. In particular, this invention relates to a transcription system over a distributed network.

2. Description of Related Art

A plethora of available systems are available for converting dictation to text. For example, speech-to-text programs allow a user to speak into a computer. The computer compares the received spoken sounds to previously identified sounds, and therefore can convert the spoken utterances into text.

Alternatively, and more traditionally, a user dictates onto a recordable media. This recordable media is forwarded to a transcriptionist who listens to the dictation and manually converts the dictation into a document. The document can then be returned to the original user for editing, or the like. Upon completion of the editing, or alternatively, if the document is in final form, the document is manually forwarded to its destination.

BRIEF SUMMARY OF THE INVENTION

While existing dictation and transcription systems work well in particular instances, they are cumbersome and fail to take advantage of current technologies.

The systems and methods of this invention receive information, such as a human voice, which is converted into a digital file. The digital file is packaged with information. This information can include, for example, information about the file, the speaker or user, formatting options, destination information, template creation information, or the like. The digital file and associated information are then transmitted via a distributed network to a transcription system. The transcription system converts the digital file into a document, taking account of any supplemental information that may be associated with the digital file. The resulting document is associated with the digital file and any associated information, and the updated document is returned to the original creator. The original creator has the option of reading, reviewing, approving, and/or revising, the document. If modifications are necessary, the process repeats itself. Otherwise, an approval of the document results in the system forwarding the document, and associated information, to the appropriate destination.

The systems and methods of this invention provide a transcription system over ha distributed network.

This invention separately provides systems and methods for assembling a digital file that contains at least dictation information and additional information.

This invention separately provides systems and methods that allow a user to interface with a dictation and/or transcription tool via a user interface.

This invention additionally provides systems and methods that allow a user to automatically assemble and subsequently distribute a document over a distributed network.

This invention additionally provides systems and methods that allow for dynamic development of a document.

This invention additionally provides systems and methods that allow for dynamic development of a document based on a template.

The transcription systems and methods of this invention use a combination of accumulated digital information and user interfaces to provide for dictation, transcription and subsequent document delivery services. The systems and methods of this invention receive dictation, and additional information, such as routing information and formatting information. The dictation and associated information are forwarded to a transcription system that converts the information into a document. This document is returned to the originator for review, modification and/or approval. Once approved, the document is routed to the appropriate destination based on the associated routing information.

These and other features and advantages of this invention are described in or are apparent from the following detailed description of preferred embodiments.

BRIEF DESCRIPTION OF THE DRAWINGS

The preferred embodiments of the invention will be described in detail, with reference to the following figures wherein.

DETAILED DESCRIPTION OF THE INVENTION

By combining dynamic routing of information with dictation information, the systems and methods of this invention streamline the entire dictation to delivery chain of events. Furthermore, by using a dedicated transcription management system, a document based on a dictation can be returned to an originator with greater efficiency.

The systems and methods in this invention allow a user to record dictation and supplement this dictation with additional information. This additional information can range from routing information, categorical information, formatting options, to template creation instructions, or the like. In general, the dictation can be enhanced with any supplemental information and the transcription system is capable of integrating this additional information and returning a document based on this information to the original dictator. However, it is to be appreciated that a completed dictation need not be returned to the original dictator, if, for example, the additional information associated with the dictation specifies an alternate destination.

A user creates a dictation. This dictation is a recording of the user's voice. Associated with this dictation may be additional information that can be selected from, for example, a template based on established information. For example, the template may be used to create a summary of a doctor's examination. Therefore, the template could have selectable portions for default characteristics, such as, runny nose, fever, or the like. Additionally, the template can have predetermined formats, for example, a business letter, with predetermined headings, closing portions, and selectable address and formatting characteristics.

The systems and methods of this invention also allow a user to fully manage all dictations within the transcription system. Specifically, the user is provided with a dictation management interface that allows access to, for example, the status of all dictation, account information, destination information, and access to stored documents.

Figure 1:
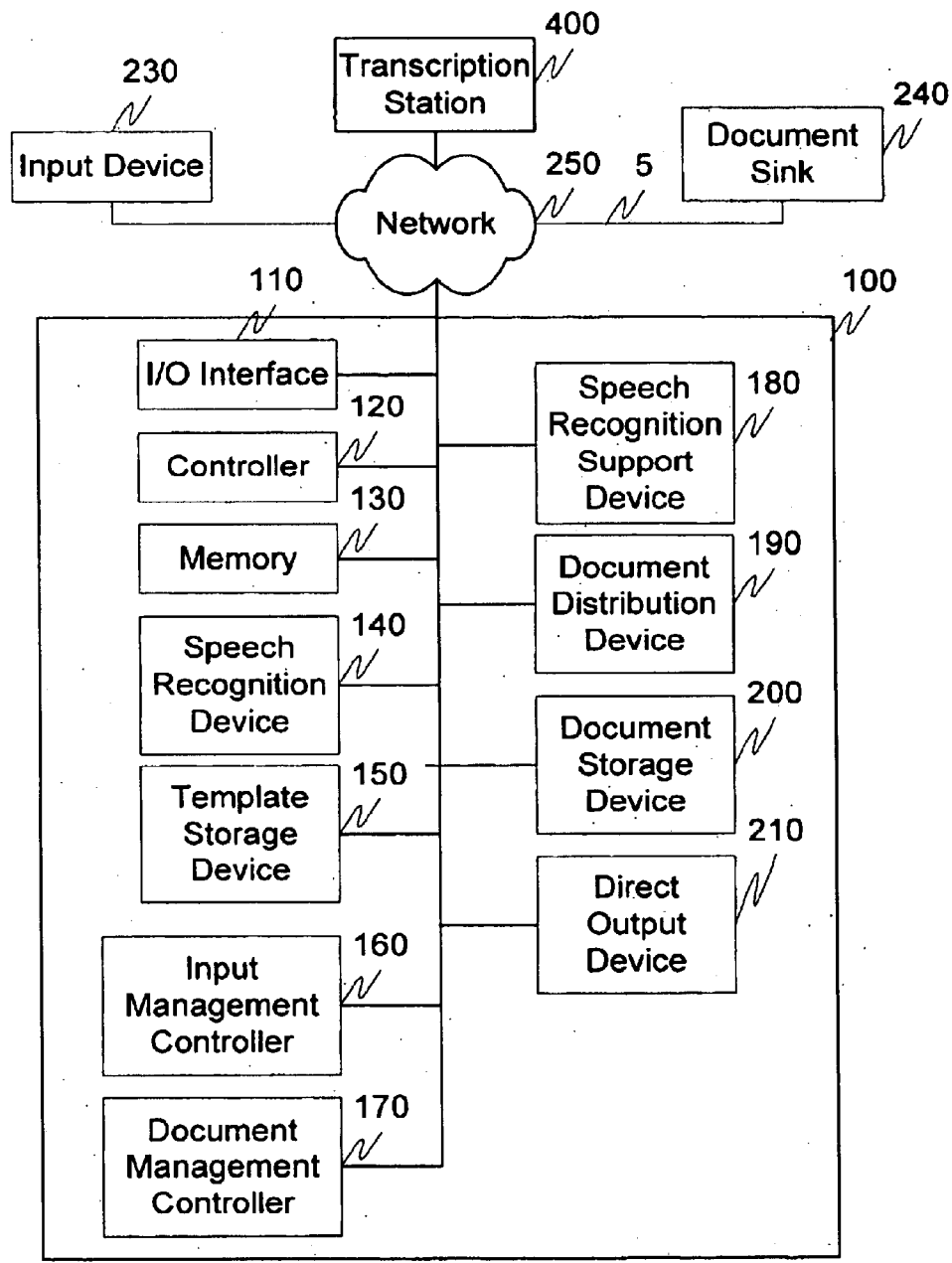
FIG. 1 is a functional block diagram illustrating an exemplary transcription system according to this invention.

FIG. 1 illustrates an exemplary embodiment of components of the transcription system 100. The transcription system 100 comprises an I/O interface 110, a controller 120, a memory 130, a speech recognition device 140, a template storage device 150, an input management controller 160, a document management controller 170, a speech recognition support device 180, a document distribution device 190, a document storage device 200 and a direct output device 210 all interconnected by link 5. The transcription system 100 is also connected to at least one distributed network 250 which may or may not also be connected to one or more other transcription systems or other distributed networks, as well as one or more input devices 230 and document sinks 240. For example, the document sinks 240 can be one or more of a printer, a personal digital assistant, a cellular phone, a personal computer, a laptop computer, an e-mail address and a facsimile machine.

While the exemplary embodiment illustrated in FIG. 1 shows the transcription system 100 and associated components collocated, it is to be appreciated that the various components of the transcription system 100 can be located at distant portions of a distributed network, such as a local area network, a wide area network, an intranet and/or the Internet or within a dictation or transcription station. Thus, it should be appreciated that the components of the transcription system 100 can be combined into one device or collocated on a particular node of a distributed network. As will be appreciated from the following description, and for reasons of computational efficiency, the components of the transcription system 100 can be arranged at any location within a distributed network without affecting the operation of the system.

Furthermore, the links 5 can be a wired or a wireless link or any known or later developed element(s) that is capable of supplying electronic data to and from the connected elements.

In operation, dictation information associated with, for example, routing information, formatting information, categorical information or the like, is received from input device 230. The input device 230 can be, for example, a telephone, a personal digital assistant, a cellular phone, a handheld voice recorder, a personal computer, a streaming media digital audio file, digital audio compact disc, or analog magnetic tape or the like.

Figure 2:
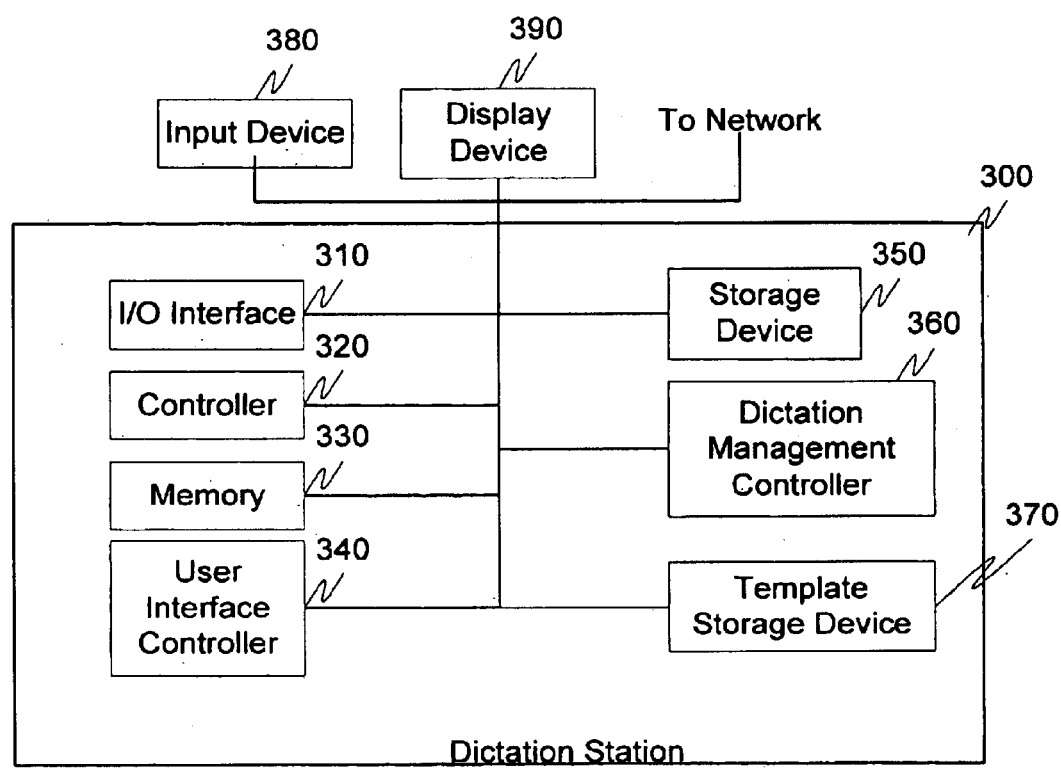
FIG. 2 is a functional block diagram illustrating an exemplary dictation station according to this invention.
Figure 3:
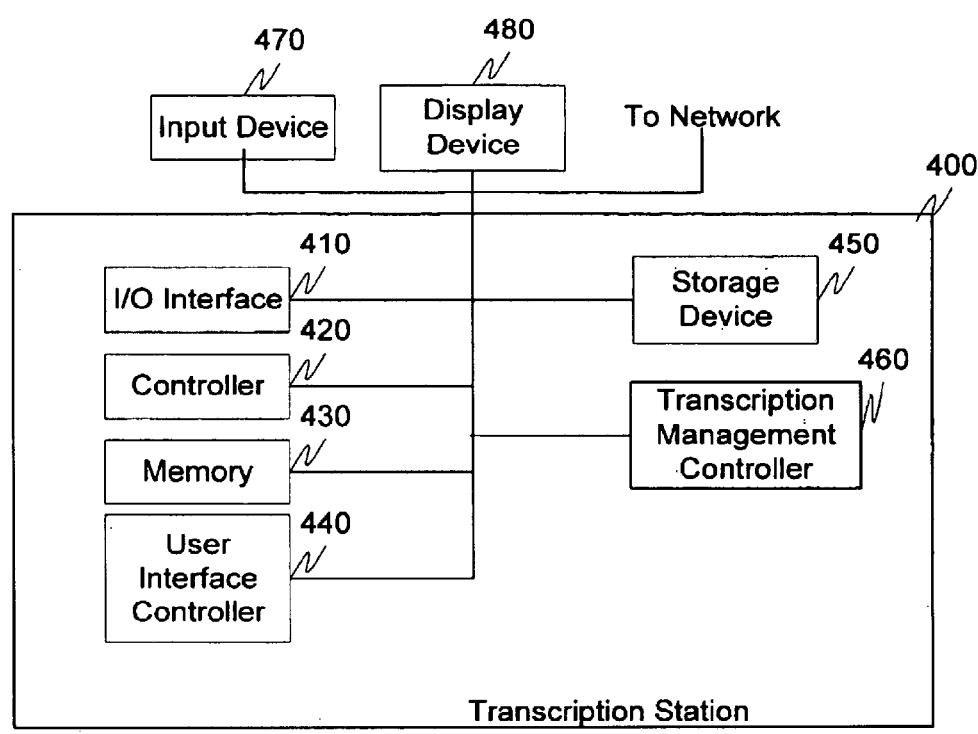
FIG. 3 is a functional block diagram of an exemplary transcription station according to this invention.

FIGS. 1–3 illustrate the transcription system, dictation station and transcription station, respectively. In operation, dictation and distribution information is received from the input device 230. This dictation and distribution information can include, but is not limited to, the actual speech which is to be converted to text, formatting options for the document, identification of a template, template options, including but not limited to static measurements, optional segments of text, numeric values for variables, or the like, categorical information, including but not limited to topics like legal, medical, or the like, priority information, and routing or distribution information for the completed document. The dictation and distribution information is received in the transcription system 100 via link 5 and the network 250 and, with the aid of the I/O interface 110, the controller 120 and the memory 130, stored in the document storage device 200. Upon receipt, the transcription system 100 determines if a complete acoustical reference file has either been appended to the distribution and dictation information, or is present in the speech recognition support device 180. The acoustical reference file allows the speech recognition device 140 to perform speech recognition on the received dictation information.

If an acoustical reference file is present in the speech recognition support device 180, the speech recognition device 140, with the aid of controller 120, the memory 130 and the acoustical reference file stored in the speech recognition support device 180 converts the dictation information into text. This text is associated with the original dictation and distribution information and is forwarded, via link 5 and network 250 to the transcription station 400 for approval, correction and/or modification.

Alternatively, if an acoustical reference file is not present in the speech recognition support device 180 for the particular user, and an acoustical reference file has not been received with the dictation and distribution information, the dictation and distribution information is forwarded, via link 5 and network 250 to the transcription station 400.

Alternatively, and depending on the type of input device 230, the transcription system 100 may directly interface with the input device 230. For example, the input device 230 could be a telephone. In this instance, a user would place a call via, for example, the network 250 and link 5 to the transcription system 100. The transcription 100, with the aid of the input management controller 160 could guide a user, for example, through a set of key-tone selectable options, to create dictation and distribution information which would then be stored in the document storage device 200. For example, upon the transcription system 100 receiving a call from the input device 230, which is a telephone, the input management controller 160, for example, queries the user as to whether a template should be used to create this document. If a template is to be used, a template can be retrieved, for example, with the selection of a predetermined keystroke, from the template storage device 150. Then, for example, portions of the template can be selected, and optionally populated, with various combinations of keystrokes. Additionally, the transcription system 100 can, at the direction of the input device 230, record dictation straight from the input device 230. Then, as previously discussed, the dictation and distribution information is stored in the document storage device 200.

After reception of the dictation and distribution information, and after speech-to-text conversion has taken place by the speech recognition device 140, if appropriate, the document storage device 200, in corporation with the document management controller 170, the I/O interface 110, the controller 120 and memory 130, forwards the dictation and distribution information, as well as the converted text, to the transcription station 400.

The transcription station 400 proofs the document, i.e., compares the document to the dictation and distribution information, and performs any necessary modifications based on information that may be associated with or contained in the dictation and distribution information. Upon completion of any modifications, the transcription station 400 returns to the transcription system 100, via the network 250 and link 5, the completed document. The document management controller 170 recognizes that the original dictation and distribution information has been supplemented with the text of the dictation and has been reviewed by the transcription station 400. Thus, the document is forwarded back to the document originator for approval.

For example, the document, with the aid of the I/O interface 110, the controller 120 and the memory 130, can be forwarded back to the input device 230 via link 5 and the network 250. Alternatively, the document can be returned to the originator, or another party, if instructions appended to the original dictation and distribution information so indicate. For example, the original dictation and distribution information could have been received over a telephone. However, the user could have specified in the dictation and distribution information that the completed document be returned to a particular e-mail address for review. Thus, the document management controller 170 would detect the presence of this routing information in the document returned from the transcription station 400 and route it to the user at the appropriate destination.

The user, via the input device 230, then either approves or performs further edits or modifications to the document. Depending on the extent of these modifications, the document is either returned to the transcription system 100 for further speech recognition and/or further processing by the transcription station 400 as previously discussed, or alternatively, returned to the transcription system 100 for distribution.

If the document is approved, the transcription system 100 receives, via link 5 the network 250, the I/O interface 110, the controller 120 and memory 130, the approved document. The document management controller 170 determines if the document has been approved and forwards the document to the document distribution device 190 for distribution. The document distribution device 190 parses the document to determine the appropriate routing. For example, the document can indicate that its contents are to be forwarded to a first destination via e-mail, a second destination via fax and a third destination by a postal carrier.

In the first instance, the document distribution device 190, in cooperation with the I/O interface 110, the controller 120 and the memory 130, routes the document, via network 250 and link 5, to the document sink 240, which in this case is an e-mail address. In the second instance, the document distribution device 190 prepares the document for delivery to a facsimile machine. Thus, in cooperation with the direct output device 210, the appropriate routing information is recovered, such as a telephone number, from the document. Thus, and again in cooperation with the I/O interface 110, the controller 120, the memory 130 and over network 250 and link 5, the facsimile is transmitted, at the direction of the direct output device 210, to a document sink 240, such as a facsimile machine.

In the third instance, the document distribution device 190 controls the direct output device 210 in order to print a copy of the document. Thus, the document sink 240 in this instance, is a printer. Then, for example, the transcription system 100 would produce a document for example, including, the completed document and an address label. This finalized document could then be delivered to a postal carrier for further delivery.

FIG. 2 illustrates an exemplary dictation station 300. The dictation station 300 can be used as an exemplary input device 230. The dictation station 300 comprises an I/O interface 310, a controller 320, a memory 330, a user interface controller 340, a storage device 350, a dictation management controller 360 and a template storage device 370, interconnected by link 5. The dictation station 300 is also connected to one or more input devices 380, display devices 390 and to a wired or wireless network.

The input device 380 can be, for example, a keyboard, a mouse, a microphone, a personal digital assistant, a hand-held analog or digital voice recorder, a digital audio compact disc, an analog magnetic tape, an interactive telephony application, personal computer, an interactive voice response system, or the like. In general, the input device 380 can be any device capable of receiving information on behalf of the dictation station 300.

The display device 390 can be, for example, a computer monitor, a PDA display, a cellular phone display, voice prompts of a telephony application, the user interface of a personal recorder, or the like. In general, the display device 390 can be any device capable of providing information, including both audio and/or visual information, from the dictation station 300 to a user.

In operation, the dictation station 300 receives input from the input device 380. For example, the user interface can be provided to a user for recordation of dictation. Thus, for example, the input device 380 can be a keyboard and mouse, and the display device 390 and a monitor. In this exemplary embodiment, the user is provided with, for example, a graphical user interface that allows for the management and recordation of dictation and distribution information. Thus, upon initialization of the dictation station 300, the user is provided with, for example, a user interface that allows for management and recordation of dictation and distribution information. For example, the user interface controller 340 can display on the display device 390 the various controls needed for recording dictation and associating supplemental information with that dictation.

Additionally, user interface controller 340, in cooperation with the template storage device 370, can present to the user, via display device 390, a template for dictation. This template can be dynamic. For example, the template can have selectable portions that have predetermined contents for population of the template. Additionally, for example, the template can have various portions into which dictation can be input. Thus, upon completion of the dictation, the dictation and any associated distribution information is stored, with the aid of the I/O interface and controller 320, in the storage device 350. Then, at the direction of the dictation management controller 360, the dictation and distribution information is forwarded, via link 5, and with the cooperation of the I/O interface 310, the controller 320 and memory 330, over a wired or a wireless network to the transcription system 100.

FIG. 3 illustrates an exemplary embodiment of a transcription station 400 according to an exemplary embodiment of the invention. The transcription station 400 comprises an I/O interface 410, a controller 420, memory 430, a user interface controller 440, a storage device 450 and a transcription management controller 460 interconnected by link 5. The transcription station 400 is also connected to an input device 470, a display device 480 and a wired or wireless network.

The input device 380 can be, for example, a keyboard, a mouse, a microphone, a personal digital assistant, a hand-held analog or digital voice recorder, a digital audio compact disc, an analog magnetic tape, an interactive telephony application, personal computer, or the like. In general, the input device 380 can be any device capable of receiving information on behalf of the dictation station 300.

The display device 390 can be, for example, a computer monitor, a PDA display, a cellular phone display, voice prompts of a telephony application, the user interface of a personal recorder, or the like. In general, the display device 390 can be any device capable of providing information from the dictation station 300 to a user.

The transcription station 400 receives one or more of dictation information, distribution information and text corresponding to speech from the transcription system 100. The transcription station 400 allows a user to transcribe received dictation, modify received text, add or modify formatting, create a template, modify distribution information, or the like. Thus, similar to the dictation station 300, the transcription station 400 is connected to one or more input devices 470 and display devices 480 such that a user can interface with the received dictation information. Thus, the user interface controller 440, in cooperation with the I/O interface, the controller 420 and the memory 430, provides the necessary interface via the display device 480 for the user to perform the necessary tasks. For example, input device 470 can be a keyboard and the display device 480 a monitor. Thus, upon receipt of dictation and distribution information, a user at transcription station 400 can input modifications to a document via input device 470 and, optionally, modify or supplement distribution information. For example, the dictation may include instructions to alter the distribution information to, for example, add or delete recipients of the document. Thus, a user at the transcription station 400 would be able to modify this distribution information which would then be stored with an updated version of the document in the storage device 450.

Upon completion of work at the transcription station 400, the transcription management controller 460 forwards, via link 5, and with the cooperation of the I/O interface 410 and controller 420, the updated document back to the transcription system 100.

This process of receiving dictation, modifying and/or proofing the resulting document, and returning that document to the originator for approval continues until a final document has been approved. Upon approval of the document, and as previously discussed, the transcription system 100 distributes the document in accordance with the distribution information associated with the document.

Figure 4:
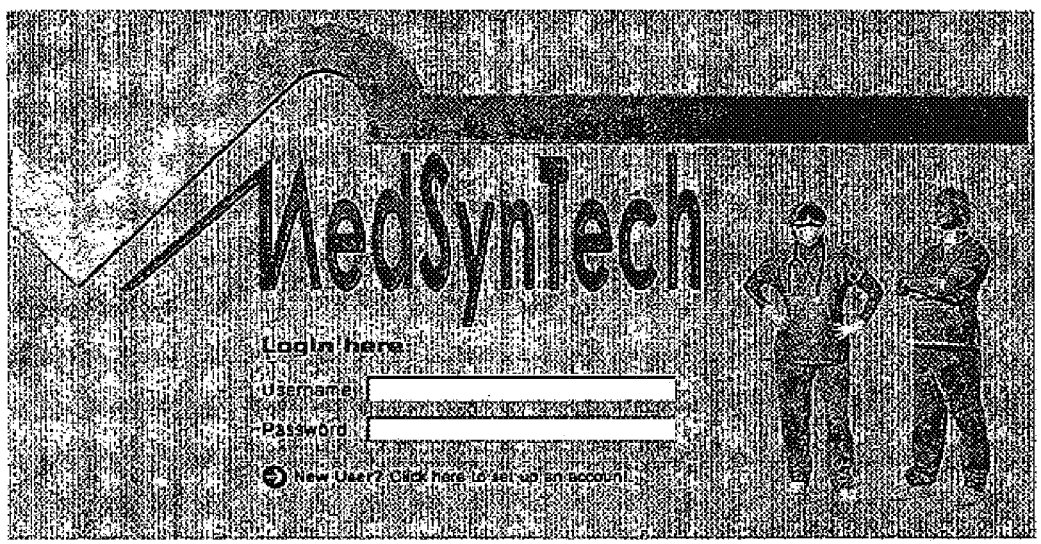
FIG. 4 is an screen shot of an exemplary dictation station user interface according to this invention.

FIGS. 4–10 illustrate exemplary user interfaces that a user may encounter during the dictation or transcription process. For example, FIG. 4 illustrates an exemplary login screen that a user may encounter to enable access to the transcription system. In particular, a user could, for example, enter a user name and password that would allow the user access to the system which could, for example, store preferences, and keep track of previously created documents, templates, and the like.

Figure 5:
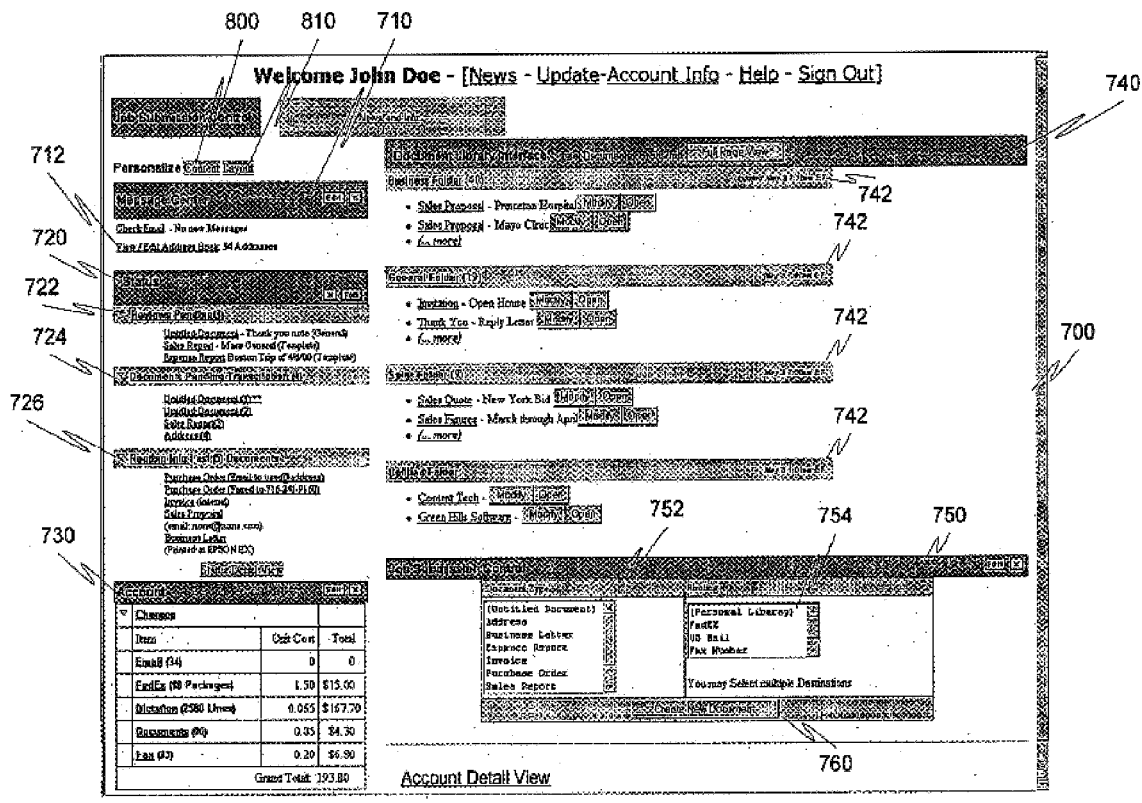
FIG. 5 is a second screen shot of an exemplary dictation station user interface according to this invention.

In particular, FIG. 5 illustrates an exemplary screen shot of a user interface a user may encounter upon logging onto the transcription system. Specifically, the account information user interface 700 could provide a summary of all, or a portion of, activities the user may have with the transcription system 100. The exemplary account information user interface 700 comprises a message center display portion 710, a status display portion 720, an account display portion 730, a document library interface display portion 740, and a job submission control display portion 750. However, it should be appreciated, that in general any information can be displayed on the account information user interface that may be useful to a particular user. For example, the user may, using the personalized content button 800 or the personalized layout button 810, customize the account information user interface to suite their particular environment. Exemplary environments include disciplines in the medial field including radiology, cardiology, orthopedics, primary care, neurosurgery, oncology, and the like as well as , accounting, legal , court reporting, real estate, insurance, law enforcement, and general business applications and the like.

The message center display portion 710 can provide access to via, for example, hyperlinks, e-mail services and address books. Therefore, for example, if a user desires to view and/or edit an entry in an address book, the user would select, for example with the click of a mouse, the hyperlink 712. Upon selection of the hyperlink 712, an address book or comparable interface could be opened that would allow a user to access and/or modify contacts and their related information, such as destination routing information.

The status display portion 720 provides the user with a summary of outstanding documents. In particular, the status display portion 720 includes, for example, three subsections. These subsections include, for example, a reviews pending display portion 722, a documents pending transcription display portion 724 and a routing information display portion 726. The reviews pending display portion 722 can, for example, summarize the documents that need approval by the user, and have already gone through at least one iteration of the transcription process. The documents pending transcription display portion 724 can display, for example, documents which may or may not have been routed through the speech recognition engine, and are awaiting further modifications at a transcription station. The routing information display portion 726 can display, for example, the delivery status of documents that have been approved by the user. For example, the routing information display portion 726 can contain a list of documents indicating that some were faxed, some were e-mailed, or, for example, some have been printed.

The account information display portion 730 summarizes the billing information for the particular user. For example, the account display portion 730 can include an itemization of particular documents based on, for example, routing information, or other user editable criteria.

The document library interface display portion 740 provide users with a summary of previously completed or partially completed documents. The document library interface display portion 740 can, for example, include a plurality of selectable subdirectories 742 which, in turn, can include a list of documents. By selecting a hyperlink associated with any one of the documents in the document library interface display portion 740, a user can then at least one of, open or modify the document as desired.

The job submission control display portion 750 allows a user to create a new document. For example, a user can select a document type in the document type display portion 752 which would provide the user with a template from which the document is generated. Additionally, the user may select routing information from the routing display portion 754 that is to be associated with a particular document. Then, this routing information can be populated with, for example, information from the address book which is selectable via the view/edit address book hyperlink 712.

Accordingly, upon selection of one or more of the document type and routing information, a user would select, for example, with the click of a mouse, the create new document button 760. This would provide the user with one or more interfaces specific to the selected document type and routing information.

Figure 6:
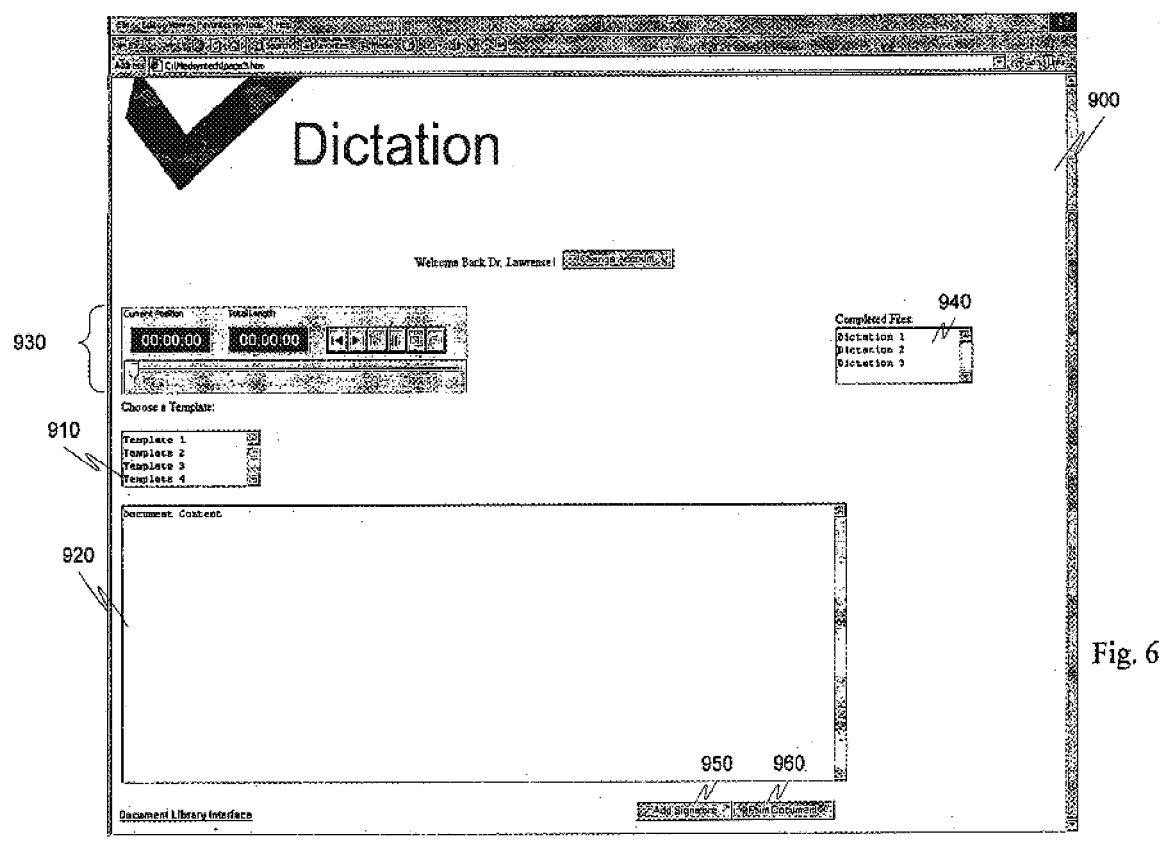
FIG. 6 is a third screen shot of an exemplary dictation station user interface according to this invention.

FIG. 6 illustrates an exemplary dictation user interface 900. The dictation user interface 900 comprises a template selection portion 910, a document display portion 920, a multimedia controller 930 and, for example, a completed file display portion 940. Additionally, the dictation user interface can have one or more buttons which, for example, allow the addition of a signature to the document 950 or allow printing of the document 960.

The template display portion 910 allows a user to select a template onto which the dictation will be merged. Then, using the controls in the multimedia control display portion 930, a user records dictation. Upon completion of the dictation, the document is added to the completed files display portion 940.

However, if the document has already been transcribed, and it has been returned to the user for review, the document display portion 920 will be populated with the already transcribed text. Therefore, for example, if this was the second instance of a letter, the document display portion 920 would contain a first draft of the letter.

Figure 7:
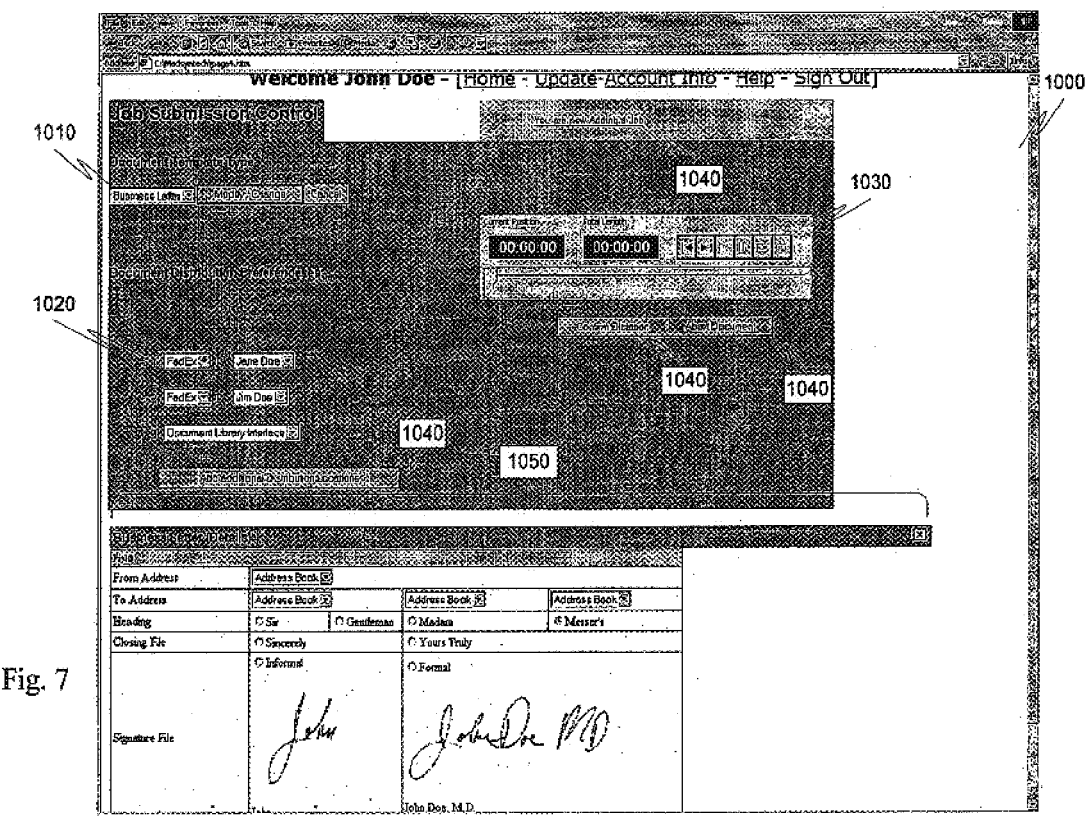
FIG. 7 is a fourth screen shot of an exemplary dictation station user interface according to this invention.

FIG. 7 illustrates an exemplary job submission control user interface 1000. The exemplary job submission control user interface 1000 contains selectable portions that assist a user in populating a template with information. For example, the job submission control user interface 1000 comprises a document template type selection portion 1010, a document distribution preference selection portion 1020, a multimedia control interface 1030, the functional control buttons 1040 and a field population display portion 1050. The document template selection portion 1010 allows a user to select and/or modify or change a template. Upon selection of a particular template, the remainder of the job submission control user interface 1000 is populated based on the selected template. For example, in the exemplary job submission control user interface 1000, a document distribution preference selection portion 1020 is displayed which indicates that, for example, two individuals and the document library interface are to receive a copy of the document. Additionally, the multimedia control portion 1030 allows a user to view, for example, the length of the dictation and current position within the dictation. The job submission control user interface 1000 contains one or more function buttons 1040 which allow, for example, a user to further customize the template by adding additional distribution locations, confirming dictation, aborting the document, or the like.

The field selection display portion 1050 allows a user to populate portions of the template based on the document template type selection. For example, the field selection display portion 1050 can include selectable menus for formatting or otherwise populating, for example, an address, a heading, a closing and a signature file.

Figure 8:
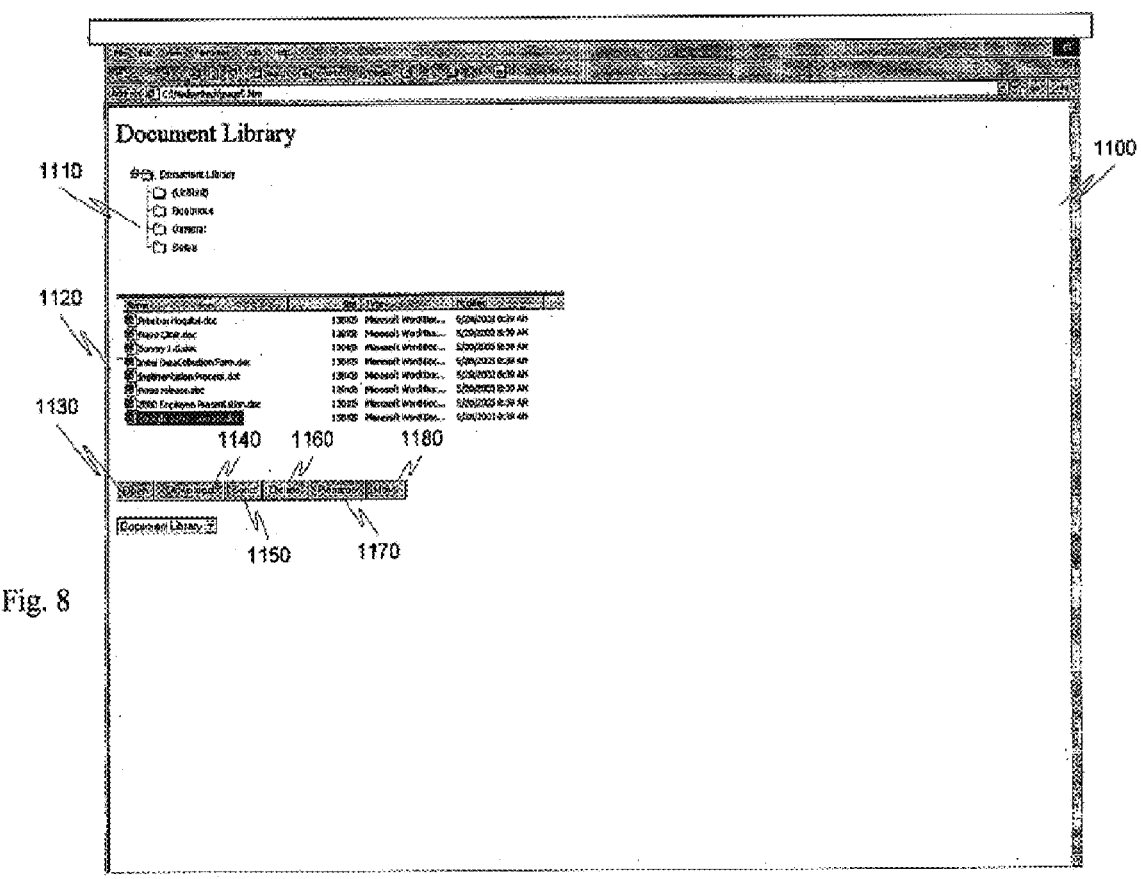
FIG. 8 is a fifth screen shot representing an exemplary document library according to this invention.

FIG. 8 illustrates an exemplary document library user interface 1100. The document library user interface 1100 comprises a directory selection portion 1110, a document display portion 1120, and associated function buttons 1130–1180.

The directory display portion 1110 comprises, for example, a list of directories within the document library. Upon selection of a particular directory, the files saved within that directory are displayed in the file display portion 1120. Then, one or more files, upon selection, can be further accessed, modified, or otherwise operated on in accordance with the function buttons 1130–1180. In particular, the function button 1130 allows a document to be opened and displayed. Alternatively, the function button 1140 allows the document to be downloaded to, for example, a PDA. The send button 1150 allows a document to be sent to one or more destinations. The delete button 1160 allows deletion of a document, the rename button 1140 allows renaming of a document, and the move button 1180 allows, for example, moving of a document to a different folder.

Figure 9:
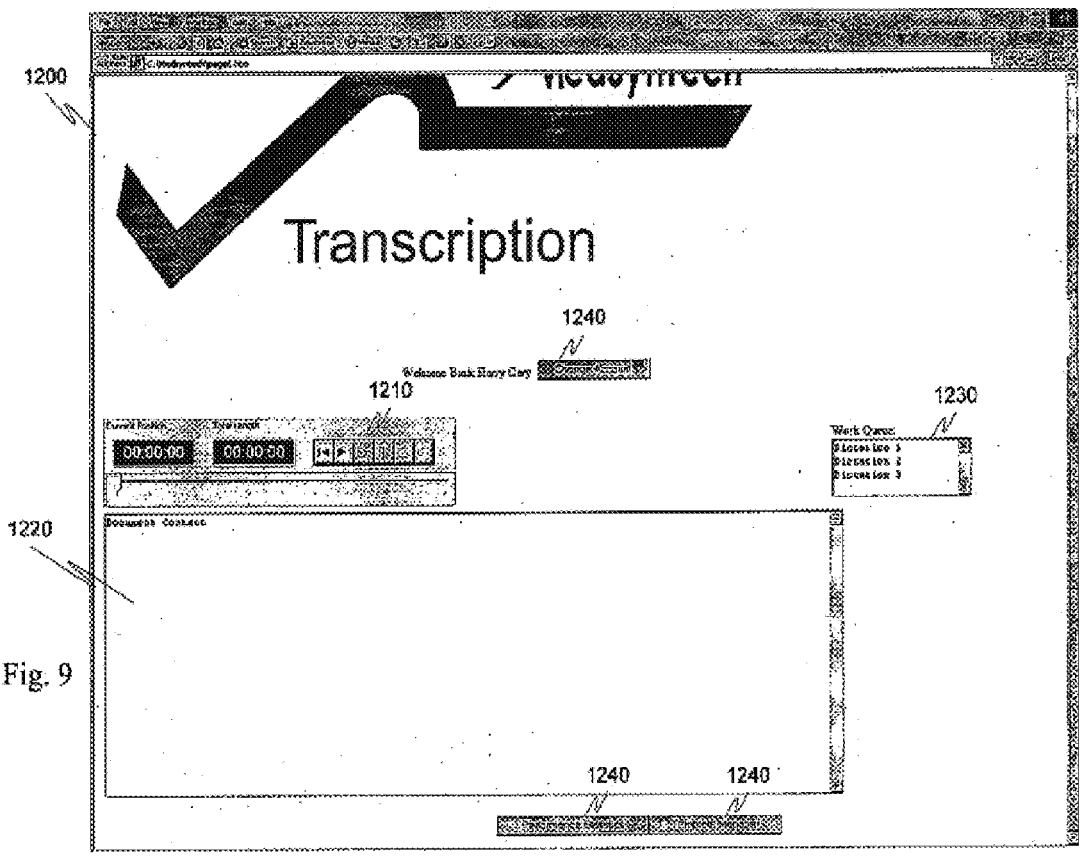
FIG. 9 is a screen shot of an exemplary transcription station user interface according to this invention.

FIG. 9 illustrates an exemplary transcription user interface which may be displayed at the transcription station 400. The transcription user interface 1200 comprises a multimedia control portion 1210, a workspace display portion 1220, a work queue display portion 1230, and one or more function buttons 1240.

The multimedia control 1210 allows a transcriptionist to play dictation and populate the workspace 1220 with that information. The work queue display portion 1230 shows a transcriptionist work jobs waiting for transcription services in a queue. The functional buttons 1240 allow a transcriptionist to view, for example, performance statistics, change account information, create or edit templates, or the like.

Figure 10:
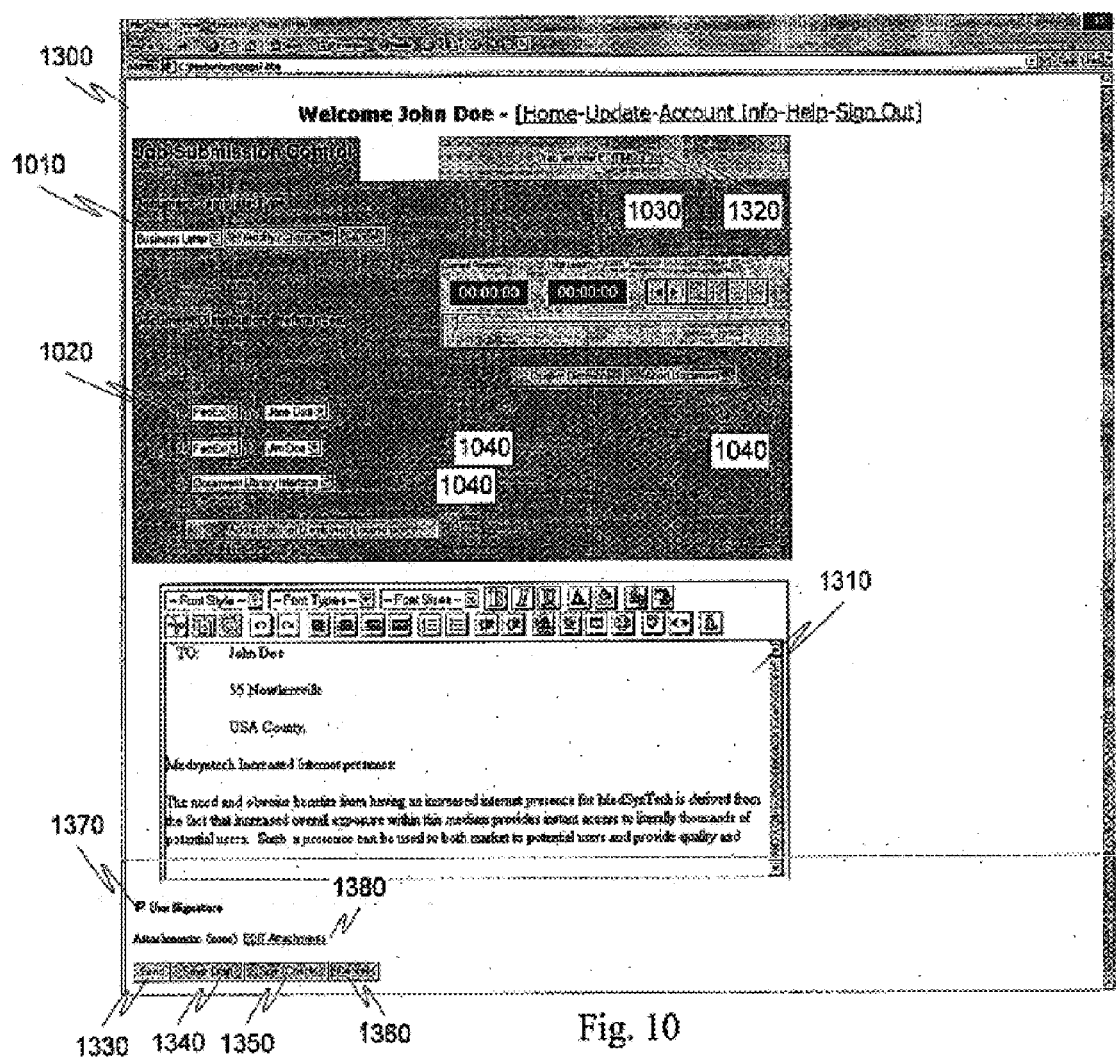
FIG. 10 is a screen shot of an exemplary transcription station user interface according to this invention.

FIG. 10 illustrates an exemplary job submission user interface for which the dictation has already been run through a speech recognition device or the transcription station as appropriate. The job submission user interface 1300 comprises a document template type selection portion 1010, a document distribution preference selection portion 1020, a multimedia control interface 1030, the functional control buttons 1040, a draft document display portion 1310, a status display portion 1320 and draft management buttons 1330–1380. The document template selection portion 1010 allows a user to select and/or modify the draft document shown in the draft document display portion 1310.

The draft management buttons 1330–1380 allow a user to interact with a draft document and/or any attachments. Specifically, the send button 1330 allows a user to send the draft document to one or more recipients. The save draft button 1340 allows a user to save modifications to a draft document for, for example, further editing at another time. The spell check button 1350 allows the user to spell check the document. The cancel button 1360 cancels the current task. The use signature check box 1370 allows a user to append a signature to the document and the edit attachments button 1380 allows a user to edit attachments, if any, associated with the document.

Figure 11:
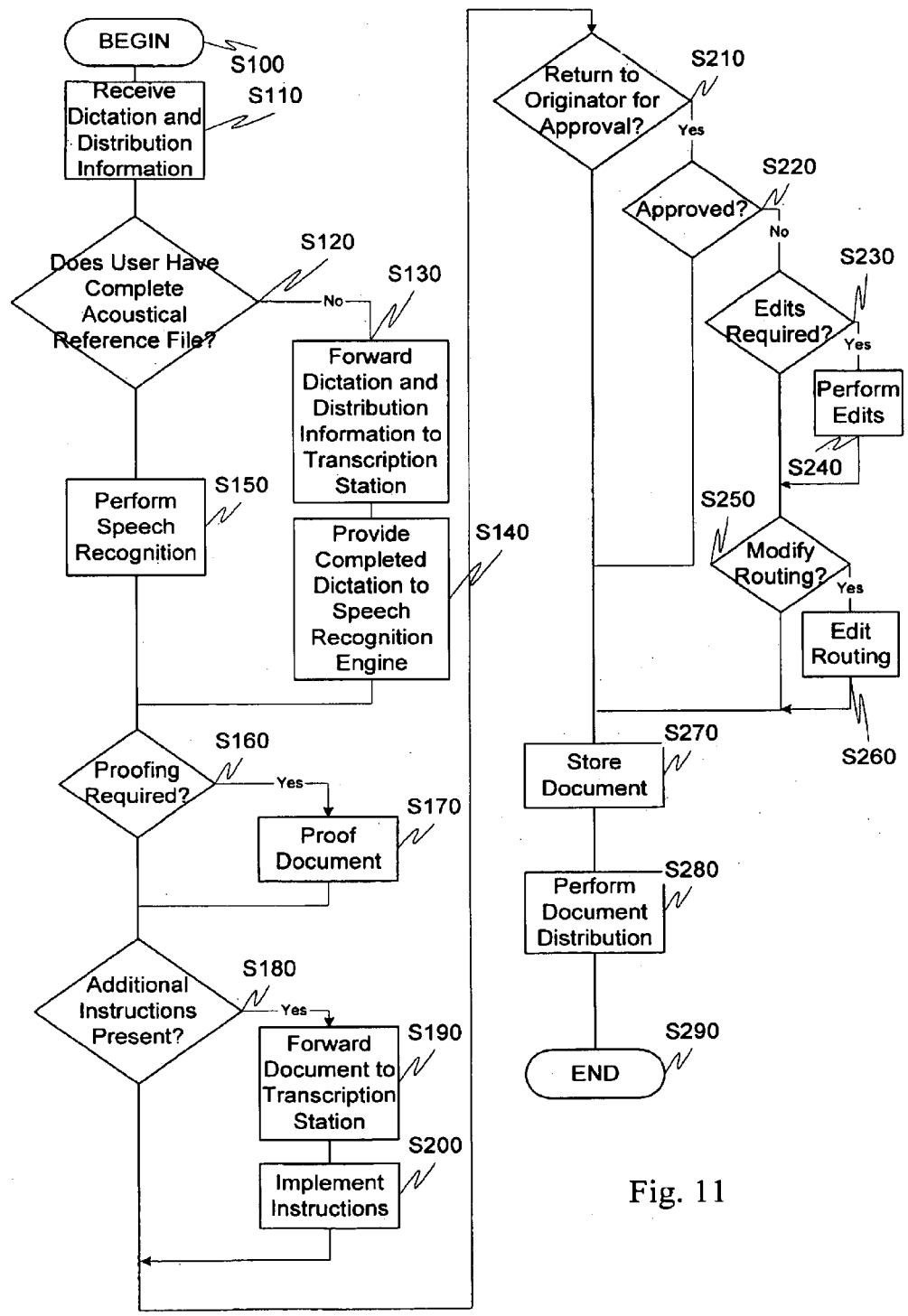
FIG. 11 is a flow chart outlining one exemplary embodiment of a method for performing transcription according to this invention.

FIG. 11 illustrates an exemplary embodiment of the operation of the transcription system according to this invention. In particular, control begins at step S100 and continues to step S110. In step S110, the dictation and distribution information is received. Next, in step S120, a determination is made whether the user has a complete acoustical reference file. If the user has a complete acoustical reference file, control jumps to step S130. Otherwise, control continues to step S150 where speech recognition is performed. Control then continues to step S160.

In step S130, the dictation and distribution information is forwarded to a transcription station. Next, in step S140, the transcribed dictation is forwarded to the speech recognition engine for development of the acoustical reference file. Control then continues to step S160.

In step S160, a determination is made whether proofing is required. If proofing is required, control jumps to step S170. Otherwise, control continues to step S180.

In step S170, the document is proofed. Control then continues to step S180. In step S180, a determination is made whether additional instructions are present. If additional instructions are present, control jumps to step S190. Otherwise, control continues to step S210.

In step S190, the document is forwarded to the transcription station. Next, in step S200, the additional instructions are implemented. For example, these additional instructions can include formatting instructions, routing instructions, template creation instructions, or the like. Control then continues to step S210.

In step S210, a determination is made whether the document is to be returned to the originator for approval. If the document is to be returned, control jumps to step S220. Otherwise, control continues to step S270.

In step S220, a determination is made whether the originator approved the document. If the originator approved the document, control jumps to step S230. Otherwise, control continues to step S270.

In step S230, a determination is made whether edits to the document or associated information are required. If edits are required, control jumps to step S240. Otherwise, control continues to step S250.

In step S240, the user edits the document and/or the associated information. Control then continues to step S250.

In step S250, a determination is made whether the routing information is to be modified. If the routing information is to be modified, control jumps to step S260. Otherwise, control continues to step S270.

In step S260, the routing information is edited. Control then continues to step S270.

In step S270, the document and the associated information is stored. Next in S280, the document is distributed in accordance with the distribution information. Control then continues to step S290 where the control sequence ends.

Figure 12:
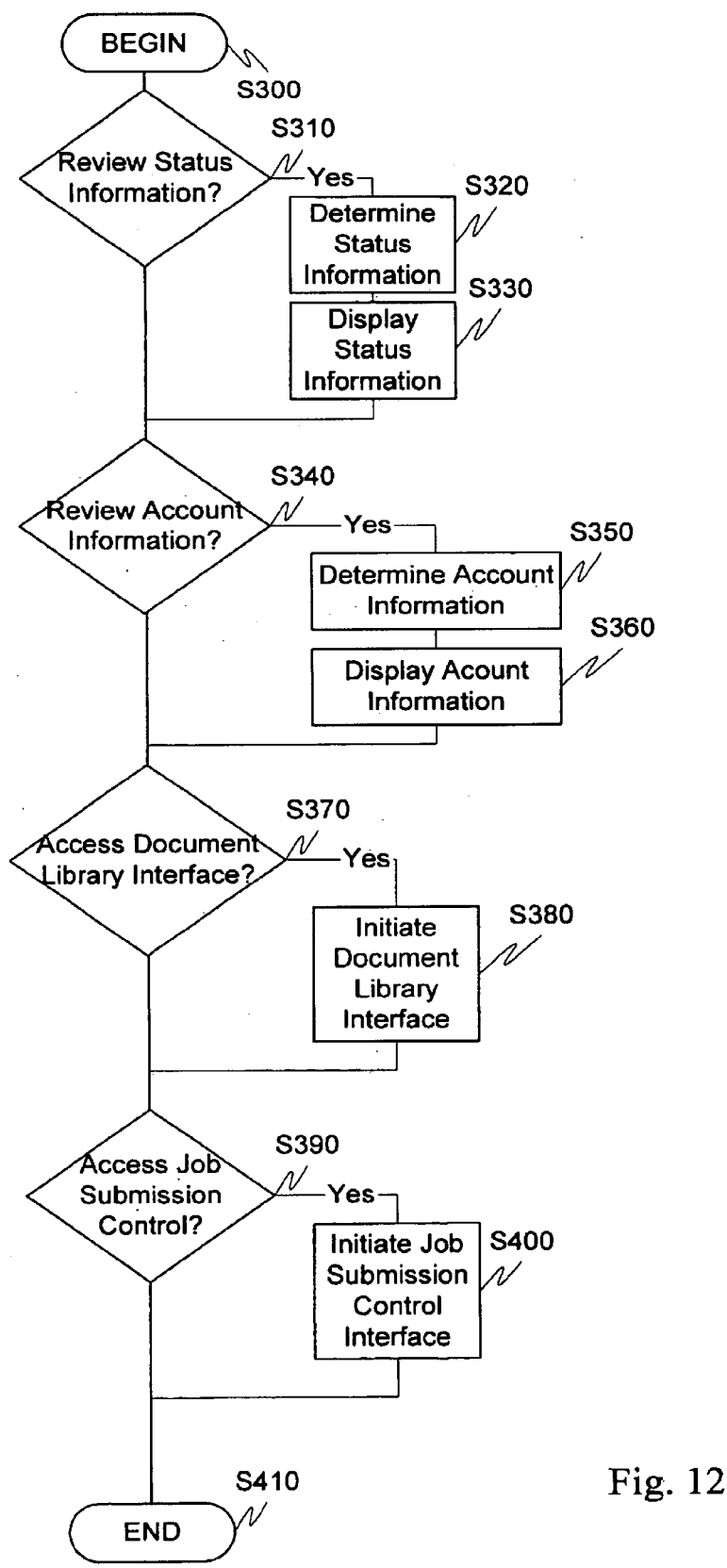
FIG. 12 is a flow chart outlining an exemplary method for interfacing with the dictation management system according to this invention.

FIG. 12 is a flowchart outlining one exemplary embodiment of a method for interfacing with the transcription system according to this invention. In particular, control begins in step S300 and continues to step S310. In step S310, a determination is made whether status information is to be reviewed. If status information is to be reviewed, control continues to step S320. In step S320, the status information is determined. Next, in step S330, the status information is displayed. Control then continues to step S340.

In step S340, a determination is made whether account information is to be reviewed. If account information is to be reviewed, control continues to step S350. In step S350, the account information is determined. Next, in step S360 the account information is displayed. Control then continues to step S370.

In step S370, a determination is made whether the document library interface is to be accessed. If the document library interface is to be accessed, control continues to step S380. Otherwise, control jumps to step S390. In step S380, the document library interface is initiated. The document library interface allows, for example, access to transcribed dictations which have been saved as documents. These documents may be for example, opened, downloaded, sent, deleted, renamed, or moved to for example, a different storage location within the document library. Control then continues to step S390.

In step S390, a determination is made whether the job submission control should be accessed. If the job submission control is to be accessed, control continues to step S400. Otherwise, control jumps to step S410 where the control sequence ends.

In step S400, the job submission control interface is initiated. Control then continues to step S410 where the control sequence ends.

Figure 13:
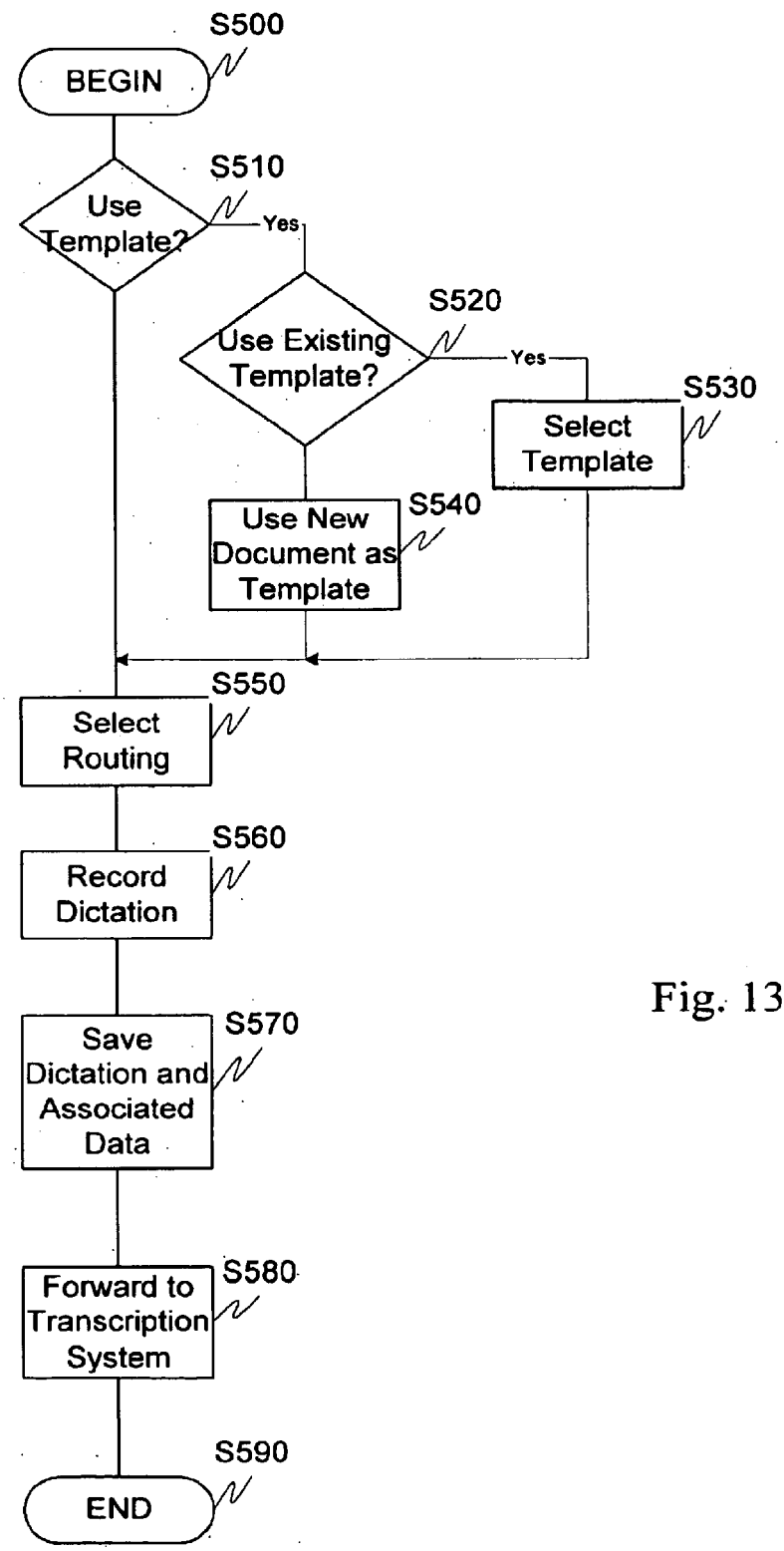
FIG. 13 is a flow chart outlining in greater detail the initiate job submission control interface of FIG. 12.

FIG. 13 illustrates in greater detail the operation of the job submission control interface step of FIG. 12. In particular, control begins in step S500 and continues to step S510. In step S510, a user is queried whether a template is to be used. If a template is to be used, control continues to step S520. Otherwise, control jumps to step S550.

In step S520, a determination is made whether an existing template is to be used for the dictation. If an existing template is to be used for the dictation, control continues to step S530.

In step S530, a template is selected. Control then continues to step S550.

In step S540, the new dictation is used to create a template. Control then continues to step S550.

In step S550, routing information is selected. Next, in step S560, the user's dictation is recorded. Then, in step S570, the dictation and any associated information is stored. Control then continues to step S580.

In step S580, the dictation and distribution information is forwarded to the transcription system. Control then continues to step S590 where the control sequence ends.

Figure 14:
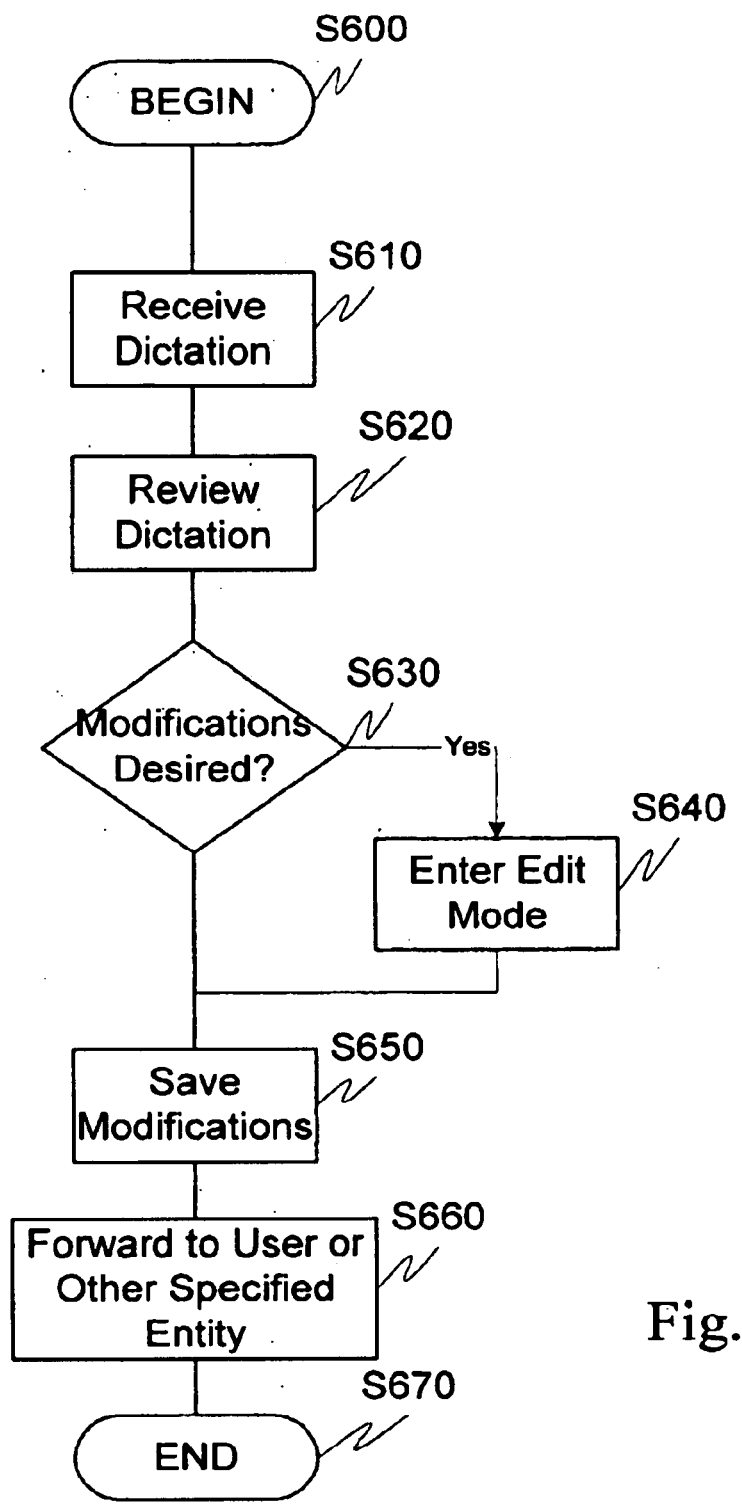
FIG. 14 is a flow chart outlining an exemplary embodiment of a method for interfacing with the transcription station according to this invention.

FIG. 14 is a flowchart outlining an exemplary embodiment of a method of operation of the transcription station according to this invention. Specifically, control begins in step S600 and continues to step S610.

In step S610, the dictation and distribution information is received. Next, in step S620, the dictation is reviewed. Then, in step S630, a determination is made whether modifications to either the dictation and/or distribution information are desired. For example, supplemental instructions found in the dictation but, for example, not transcribed by the speech recognition engine can then be implemented at the transcription station. Control then jumps to step S640. Otherwise, control continues to step S650.

In step S640, edits to the dictation and/or distribution information are performed. Control then continues to step S650.

In step S650, the modifications are saved. Control then continues to step S660 where the dictation and distribution information is returned to the transcription system. Control then continues to step S670 where the control sequence ends.

As shown in FIGS. 1—3, the transcription and associated systems are preferably implemented either on single program general purpose computers, or separate program general purpose computers. However, the transcription system dictation and transcription stations can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine is in turn capable of implementing the flowcharts illustrated in FIGS. 11–14 can be used to implement the transcription system according to this invention.

Furthermore, the disclosed method may be readily implemented in software using object or object-oriented software development environments that provide portable source code that can be used or a variety of computer or workstation hardware platforms. Alternatively, the disclosed transcription system may be implemented partially or fully in hardware using standard logic circuits or VLSI design. Whether software or hardware used to implement the systems in accordance with this invention is dependent on the speed and/or efficiency requirements of the system, the particular function, and the particular software or hardware systems or microprocessor or microcomputer systems being utilized. The transcription systems and methods described above, however, can be readily implemented in hardware and/or software using any known or later-developed systems or structures, devices and/or software by those skilled in the applicable art without undue experimentation from the function description provided herein together with a general knowledge of the computer arts.

Moreover, the disclosed methods may be readily implemented as software executed on a programmed general purpose computer, a special purpose computer, a microprocessor, or the like. In this instance, the methods and systems of this invention can be implemented as a routine embedded on a personal computer such as a Java® or CGI script, as a resource residing on a server or graphics workstation, as a routine embedded in a dedicated transcription system, a web browser, a cellular telephone, a PDA, a dedicated dictation or transcription system, or the like. The transcription system can also be implemented by physically incorporating the system and method into a software and/or hardware system, such as the hardware and software systems of a graphics workstation or dedicated transcription system.

It is, therefore, apparent that there has been provided, in accordance with the present invention, systems and methods for transcribing and routing dictation over one or more distributed networks. While this invention has been described in conjunction with preferred embodiments thereof, it is evident that many alternatives, modifications, and variations be apparent to those skilled in the applicable arts. Accordingly, Applicants intend to embrace all such alternatives, modifications and variations that follow in the spirit and scope of this invention.

What is claimed is:

1. A dictation and transcription management system that manages dictation over a distributed network comprising:
    a transcription system that receives dictation information, wherein the dictation information includes dictation and supplemental information capable of being selected from a dynamic template;
    a dictation conversion device that converts the dictation information into a document, the document capable of being used as a second dynamic template based on instructions associated with the dictation information; and
    a document distribution device that determines routing of a document based on distribution information associated with the dictation information.

2. The system of claim 1, further comprising a dictation station that interacts with a user to capture the dictation and distribution information.

3. The system of claim 2, wherein the dictation station is at least one of a personal digital assistant, a cellular phone, a personal computer, an analog or digital dictation receiving device and a telephone.

4. The system of claim 2, wherein the interaction includes at least one of job submission control, document library interface control, account information access and status information access.

5. The system of claim 4, wherein the updating comprises at least one of verification, modification and correction of at least one of the document and distribution information.

6. The system of claim 5, wherein the document sink is at least one of a printer, a personal digital assistant, a cellular phone, a personal computer, a laptop computer, an e-mail address and a facsimile machine.

7. The system of claim 1, further comprising a transcription station that allows updating of the document.

8. The system of claim 1, wherein the distribution information allows the document to be automatically routed to a document sink.

9. A method for managing dictation and distribution information comprising:
    receiving dictation information, wherein the dictation information includes dictation and supplemental information capable of being selected from a dynamic template;
    converting the dictation information into a document, the document capable of being used as a second dynamic template based on instructions associated with the dictation information;
    comparing the document to the dictation information; and
    routing the document based on distribution information.

10. The method of claim 9, further comprising modifying the document based on the dictation information.

11. The method of claim 9, wherein the document is routed to at least one of a printer, a personal digital assistant, a cellular phone, a personal computer, a laptop computer, an e-mail address and a facsimile machine.

12. The method of claim 9, wherein the dictation and distribution information is received from at least one of a personal digital assistant, a cellular phone, a personal computer, an analog or digital dictation receiving device and a telephone.

13. The method of claim 9, further comprising obtaining approval of the document.

14. The method of claim 9, further comprising determining a template based on one or more of the dictation and distribution information.

15. The method of claim 14, wherein the template is used to guide a user through inputting of one or more of the dictation and distribution information.

16. An information storage media that stores information for managing dictation and distribution information comprising:
    information that receives dictation information, wherein the dictation information includes dictation and supplemental information capable of being selected from a dynamic template;
    information that converts the dictation information into a document, the document capable of being used as a second dynamic template based on instructions associated with the dictation information;
    information that compares the document to the dictation information; and
    information that routes the document based on distribution information.

17. The information storage media of claim 16, further comprising information that modifies the document based on the dictation information.

18. The information storage media of claim 16, wherein the document is routed to at least one of a printer, a personal digital assistant, a cellular phone, a personal computer, a laptop computer, an e-mail address and a facsimile machine.

19. The information storage media of claim 16, wherein the dictation and distribution information is received from at least one of a personal digital assistant, a cellular phone, a personal computer, an analog or digital dictation receiving device and a telephone.

20. The information storage media of claim 16, further comprising information that obtains approval of the document.

21. The information storage media of claim 16, further comprising information that determines a template based on one or more of the dictation and distribution information.

22. The information storage media of claim 21, wherein the template is used to guide a user through inputting of one or more of the dictation and distribution information.

23. A dictation and transcription management system that manages dictation in a distributed network environment comprising:

a transcription system that receives dictation information, wherein the dictation information includes dictation, instructions and supplemental information selected from a dynamic template; and a dictation conversion device that converts the dictation information into a document, the document capable of being saved as a second dynamic template based on the instructions.

24. The system of claim 23, further comprising:

a document management module adapted to display status information regarding one or more documents, the status information including at least one of review pending information, documents pending transcription information and routing information.

25. The system of claim 24, wherein the routing information includes information reflecting a distribution status of one or more documents.

26. The system of claim 24, wherein the review pending information includes information reflecting documents ready for user review.

27. The system of claim 24, wherein the documents pending transcription information includes the status of one or more documents awaiting transcription.

* * * * *

UNITED STATES PATENT AND TRADEMARK OFFICE
CERTIFICATE OF CORRECTION

PATENT NO.      : 6,789,060 B1                                          Page 1 of 1
DATED           : September 7, 2004
INVENTOR(S)     : Gene J. Wolfe and Seth A. Borg It is certified that error appears in the above-identified patent and that said Letters Patent is hereby corrected as shown below:

<u>Title page,</u>
Item [63], Related U.S. Application Data, should read
-- November 1, 1999 (US)............ 60/162,969 --.

Signed and Sealed this

Twenty-second Day of March, 2005

JON W. DUDAS
*Director of the United States Patent and Trademark Office*